United States Patent [19]
Ochiai

[11] Patent Number: 5,931,884
[45] Date of Patent: *Aug. 3, 1999

[54] CONTINUOUSLY VARIABLE TRANSMISSION CONTROL METHOD AND APPARATUS

[75] Inventor: Tatsuo Ochiai, Fujisawa, Japan

[73] Assignee: Nissan Motor Co., Ltd., Yokohama, Japan

[*] Notice: This patent is subject to a terminal disclaimer.

[21] Appl. No.: 08/812,780

[22] Filed: Mar. 6, 1997

[30]    Foreign Application Priority Data

Mar. 7, 1996 [JP] Japan ................................ 8-049890

[51] Int. Cl.$^6$ .................................................. B60K 41/12
[52] U.S. Cl. ............................... 701/51; 701/61; 701/70; 477/45; 477/46; 477/44; 477/101; 477/107; 477/110; 477/115
[58] Field of Search ................................. 701/51, 61, 70; 477/44, 101, 107, 10, 115

[56]              References Cited

FOREIGN PATENT DOCUMENTS 7-265627 of 1994 Japan .

*Primary Examiner*—Willam A. Cuchlinski, Jr.
*Assistant Examiner*—Yonel Beaulieu
*Attorney, Agent, or Firm*—Foley & Lardner

[57]              ABSTRACT

A method and apparatus for controlling a transmission for use with an automotive vehicle including an engine. The transmission coupled to the engine for transmitting a torque inputted thereto from the engine to produce an output torque at a continuously variable speed ratio. A target value for the speed ratio is calculated based on vehicle operating conditions. A rate at which the speed ratio changes to the calculated target value is calculated. An upper limit for the rate is calculated to satisfy such a condition that the output torque is substantially equal to or greater than zero. The rate of change of the speed ratio is limited to the upper limit when the calculated rate of change of the speed ratio is greater than the upper limit.

18 Claims, 6 Drawing Sheets

CONTINUOUSLY VARIABLE TRANSMISSION CONTROL METHOD AND APPARATUS

BACKGROUND OF THE INVENTION

This invention relates to a method and apparatus for controlling a transmission adapted to transmit a torque inputted thereto from an engine to produce an output torque at a continuously variable speed ratio.

It is the current practice to perform shift control for continuously variable transmissions such as V-belt transmissions, toroidal type transmissions and the like by changing the transmission speed ratio in a stepless manner to a target value calculated based on vehicle operating conditions. For example, Japanese Patent Application No. 7-265627 discloses a transmission control apparatus arranged to control the rate at which the transmission speed ratio changes to a target value. One problem associated with this type of shift control is an undesirable deceleration feel provided to the passenger when the transmission speed ratio changes at an excessive rate, for example, when a kick-down change is produced.

SUMMARY OF THE INVENTION

A main object of the invention is to provide a transmission control method and apparatus which can avoid an undesirable deceleration feel which may be provided to the passenger when the speed ratio changes at an excessive rate.

There is provided, in accordance with the invention, an apparatus for use with an automotive vehicle including an engine and a transmission coupled to the engine for transmitting a torque inputted thereto from the engine to produce an output torque at a continuously variable speed ratio. The apparatus comprises means for sensing vehicle operating conditions, means for calculating a target value for the speed ratio based on the sensed vehicle operating conditions, means for calculating a rate at which the speed ratio changes to the calculated target value, means for calculating an upper limit for the rate to satisfy a condition that the output torque is substantially equal to or greater than zero, and means for limiting the rate of change of the speed ratio to the upper limit when the calculated rate of change of the speed ratio is greater than the upper limit.

In another aspect of the invention, there is provided a method of controlling a transmission for use with an automotive vehicle including an engine. The transmission is coupled to the engine for transmitting a torque inputted thereto from the engine to produce an output torque at a continuously variable speed ratio. The method comprises the steps of sensing vehicle operating conditions, calculating a target value for the speed ratio based on the sensed vehicle operating conditions, calculating a rate at which the speed ratio changes to the calculated target value, calculating an upper limit for the rate to satisfy a condition that the output torque is substantially equal to or greater than zero, and limiting the rate of change of the speed ratio to the upper limit when the calculated rate of change of the speed ratio is greater than the upper limit.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
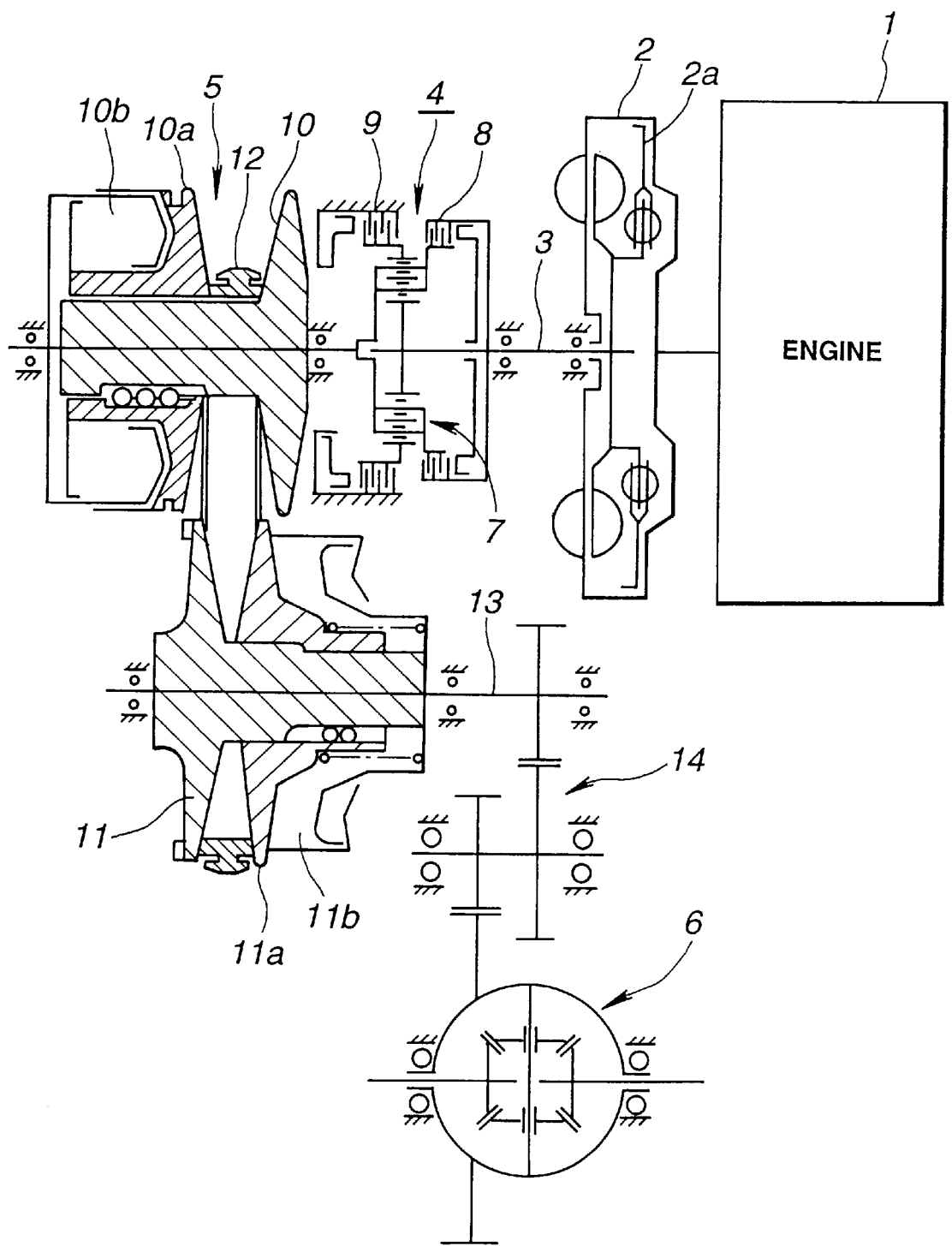
FIG. 1 is a schematic diagram showing a V-belt type transmission to which the invention is applicable.

With reference to the drawings and in particular to FIG. 1, there is shown a schematic diagram of a transmission control apparatus embodying the invention. The transmission control apparatus is intended for use with an automotive vehicle having an internal combustion engine 1, a transmission 5 and a differential 6. The transmission 5 is shown as a V-belt type continuously variable transmission having a torque converter 2 provided with a lockup clutch 2a. The transmission 5 also has an input shaft 3 to which a drive is transmitted through the torque converter 2 from the engine 1, a forward/reverse change-over mechanism 4, and an output shaft 13 from which a drive is transmitted through a parallel gear unit 14 to the differential 6. The lockup clutch 2a is closed, locked, applied or engaged to complete a mechanical connection between the engine 1 and the input shaft 3. This lockup clutch operation mode is referred to as a lockup mode. The lockup clutch 2a is opened, unlocked, released or disengaged so that a hydrodynamic driving connection exists between the engine 1 and the input shaft 3. This lockup clutch operation mode is referred to as a converter mode. The forward/reverse change-over mechanism 4 includes a double pinion type planetary gear unit 7 associated with a forward clutch 8 and a reverse brake 9. The forward/reverse change-over mechanism 4 operates in a forward mode to transmit the rotation of the input shaft 3 to the transmission 5 when the forward clutch 8 is engaged and in a reverse mode to reverse the direction of the rotation of the input shaft 3 transmitted to the transmission 5 when the reverse brake 9 is engaged.

The V-belt type transmission 5 includes a primary pulley 10 to which rotation is transmitted through the forward/reverse change-over mechanism 4, a secondary pulley 11 from which rotation is transmitted to the output shaft 13, and a V belt 12. The primary pulley 10 has fixed and movable flanges between which the V belt 12 is journalled on the primary pulley 10. The movable flange 10a is adapted to move axially of the primary pulley 10 but rotate as a unit with the primary pulley 10. The axial position of the movable flange 10a is determined by the pressure introduced into a cylinder chamber 10b. Similarly, the secondary pulley 11 has fixed and movable flanges between which the V belt 12 is journalled on the secondary pulley 11. The movable flange 11a is adapted to move axially of the secondary pulley 11 but rotate as a unit with the secondary pulley 11. The axial position of the movable flange 11a is determined by the pressure introduced into a cylinder chamber 11b. A line pressure $P_L$, which is determined according to the torque transmitted to the V-belt transmission 5, is introduced into the secondary pulley cylinder chamber 11b and also through a shift control valve 21 (FIG. 2) into the primary pulley cylinder chamber 10b. The ratio of the pressure $P_1$ (primary pulley pressure) acting in the primary pulley cylinder chamber 10b with respect to the pressure $P_2$ (secondary pulley pressure) acting in the secondary pulley cylinder chamber 11b determines the ratio of the diameter of the V belt 12 journalled on the primary pulley 10 with respect to the diameter of the V belt 12 journalled on the secondary pulley 11 and thus the transmission ratio (speed ratio) between the primary and secondary pulleys 10 and 11. The V-belt transmission 5 transmits the rotation of the primary pulley 10 through the V belt 12 to the secondary pulley 11 at such a speed ratio as determined by the operation of the shift control valve. It is, therefore, possible to increase the speed ratio in a stepless manner from its minimum value toward its maximum value by operating the shift control valve 21 to increase the primary pulley pressure $P_1$ and to decrease the speed ratio in a stepless manner from the maximum speed ratio toward the minimum speed ratio by operating the shift control valve 21 to decrease the primary pulley pressure $P_1$.

Figure 2:
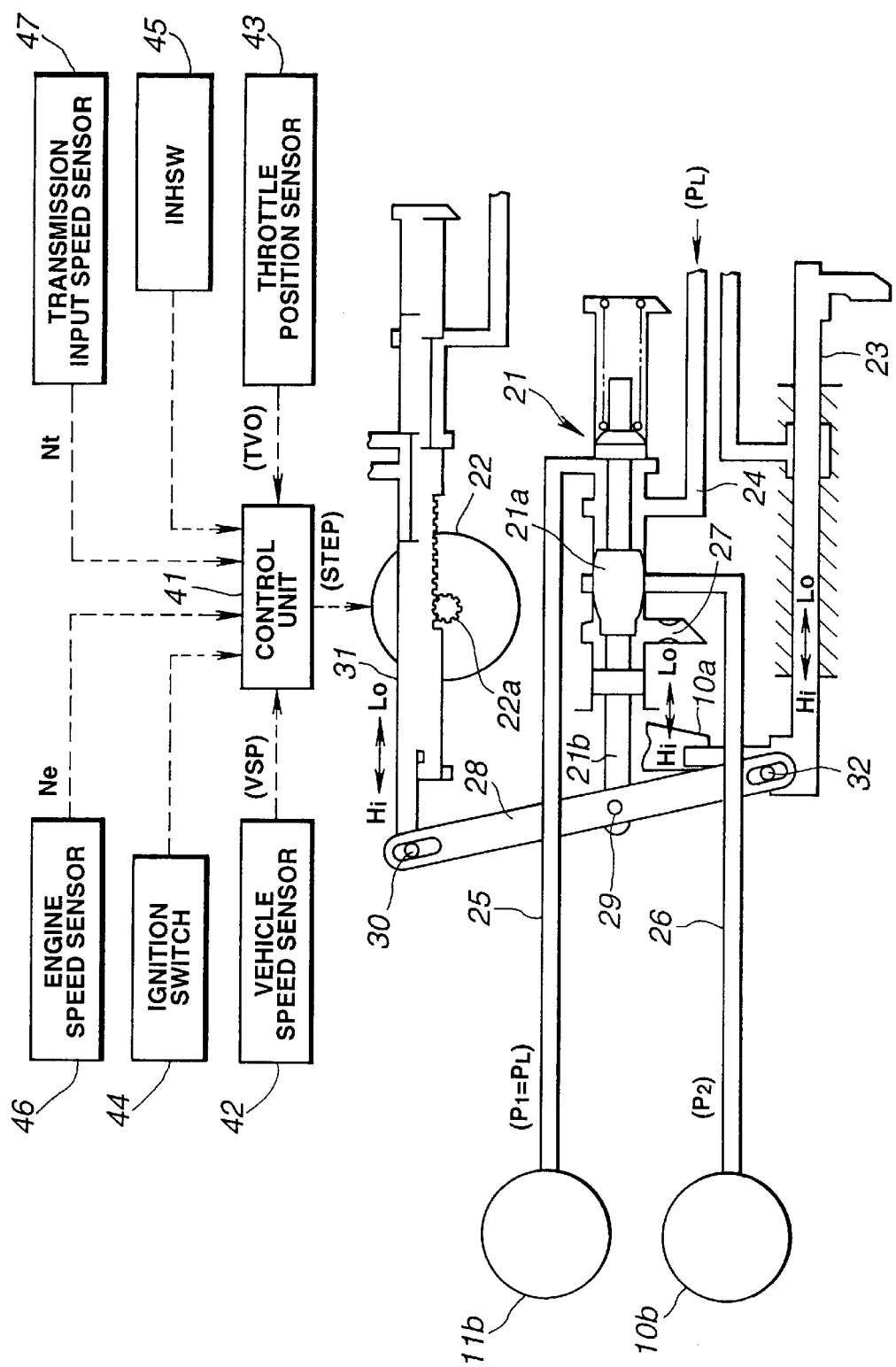
FIG. 2 is a schematic diagram showing one embodiment of a transmission control apparatus made in accordance with the invention.

Referring to FIG. 2, there is shown a shift control actuator for making a change in the position of the shift control valve 21. The shift control valve 21 has a shift control spool 21a fixedly mounted on a piston rod 21b for reciprocate, within a cylinder bore, between first and second positions. At the first position, the shift control spool 21a permits communication of a primary pulley pressure conduit 26 connected to the primary pulley cylinder chamber 10b with a drain port 27 and interrupts the communication of the primary pulley pressure conduit 26 with a line pressure conduit 24 connected to a source of the line pressure $P_L$. At the second position, the spool 21a permits interrupts the communication of the primary pulley pressure conduit 26 with the drain port 27 and permits the communication of the primary pulley pressure conduit 26 with the drain port 27. The secondary pulley pressure conduit 25 connected to the secondary pulley cylinder chamber 11b is always connected to the line pressure conduit 24 regardless of the position of the shift control spool 21a. The piston rod 21b is pivoted at its one end to a shift control link 28 substantially intermediate its ends. Displacement of the shift control spool 21a is effected by the shift control link 28, one end of which is slotted to receive a pin 30 fixed on a rack 31, the other end of the shift control link 28 being slotted to receive a pin 32 fixed to a speed ratio feedback member 23. The rack 31 is engaged with a pinion 22a mounted on the output shaft of a step motor 22. The step position of the step motor 22 determines the stroke position of the rack 31. The movement of the rack 31 causes the shift control link 28 to rotate about the pin 32 so as to move the shift control spool 21 in the same direction as the rack 31.

When the step motor 22 rotates in a first direction moving the rack 31 in a direction indicated by the arrow Hi to increase the speed ratio, the shift control spool 21a moves to the left, as viewed in FIG. 2, to connect the primary pulley pressure conduit 26 to the line pressure conduit 24 so as to increase the primary pulley pressure $P_1$ acting in the primary pulley cylinder chamber 10b. In this case, the primary pulley movable flange 10a (FIG. 1) moves toward the corresponding fixed flange to increase the speed ratio in a stepless manner by an amount corresponding to the increase of the primary pulley pressure $P_1$. The primary pulley movable flange 10a is drivingly connected to the speed ratio feedback member 23 in such a manner that the speed ratio feedback member 23 moves by the degree to which the primary pulley movable flange 10a moves toward the corresponding fixed flange. For this reason, the speed ratio feedback member 23 moves in a direction indicated by the arrow Hi to return the shift control spool 21a. The shift control spool 21a returns to its initial position (illustrated position), that is, the shift control is completed when the speed ratio corresponding to the displacement of the rack 31 in the direction indicated by the arrow Hi is obtained.

When the step motor 22 rotates in a second direction moving the rack 31 in a direction indicated by the arrow Lo to decrease the speed ratio, the shift control spool 21a moves to the right, as viewed in FIG. 2, to connect the primary pulley pressure conduit 26 to the drain port 27 so as to decrease the primary pulley pressure $P_1$ acting in the primary pulley cylinder chamber 10b. In this case, the primary pulley movable flange 10a (FIG. 1) moves away from the corresponding fixed flange to decrease the speed ratio in a stepless manner by an amount corresponding to the decrease of the primary pulley pressure $P_1$. The primary pulley movable flange 10a is drivingly connected to the speed ratio feedback member 23 in such a manner that the speed ratio feedback member 23 moves by the degree to which the primary pulley movable flange 10a moves away from the corresponding fixed flange. For this reason, the speed ratio feedback member 23 moves in a direction indicated by the arrow Lo to return the shift control spool 21a. The shift control spool 21a returns to its initial position (illustrated position), that is, the shift control is completed when the speed ratio corresponding to the displacement of the rack 31 in the direction indicated by the arrow Lo is obtained.

A control unit 41 is provided to control the step motor 22. For this purpose, the control unit 41 calculates target values for the speed ratio of the transmission and the rate of change of the speed ratio. The calculated target values are converted into the form of a required step number (Step), that is, the required number of steps in which the step motor 22 is to be rotated in a predetermined period of time. The step number (Step) is transferred to a step motor control circuit which causes the step motor 22 to make a change in the position of the shift control valve 21 so as to change the calculated speed ratio at the calculated rate. The control unit 41 also controls the lockup clutch 2a to operate the torque converter 2 in the converter mode in the presence of demands for increased torque or in the lockup mode in the absence of demands for increased torque. These controls are performed based on various conditions sensed when the vehicle is operating. Thus, a vehicle speed sensor 42, a throttle position sensor 43, an engine ignition switch 44, an inhibitor switch (INHSW) 45, an engine speed sensor 46 and a transmission input shaft speed sensor 47 are connected to the control unit. The vehicle speed sensor 42 is positioned to sense the speed VSP of longitudinal movement of the vehicle for producing a signal indicative of the sensed vehicle speed VSP. The throttle position sensor 43 is placed to sense the degree TVO of rotation of the throttle valve situated to control the amount of air permitted to enter the engine for producing a signal indicative of the sensed throttle position TVO. The engine ignition switch 46 is closed, indicative of the engine being running. The inhibitor switch 45 provides information related to the selected one of the P, R, N and D ranges. The engine speed sensor 46 senses the speed Ne of rotation of the engine 1 for producing a signal indicative of the sensed engine speed Ne. The transmission input shaft speed sensor 47 senses the transmission input shaft 3 speed Nt for producing a signal indicative of the transmission input speed Nt. This signal may be used to deduce the primary pulley speed ω.

The control unit 41 may employ a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received analog signals into corresponding digital signals for application to the central processing unit. The read only memory contains the programs for operating the central processing unit and also appropriate data in look-up tables used in calculating an appropriate value for the duty cycle of the control signal applied to control the lockup clutch 2a and an appropriate value for the repetitive rate of the drive signal applied to control the step motor 22. A control word specifying a desired duty cycle is transferred by the central processing unit to the input/output control unit which converts it into a control signal to the lockup solenoid (not shown) for operating the torque converter 2 in the desired mode. A control word specifying a desired repetitive rate is transferred by the central processing unit to the input/output control unit which converts it into a drive signal to the step motor 22 for operating the shift control actuator to achieve the desired speed ratio in the V-belt transmission 5.

Figure 3:
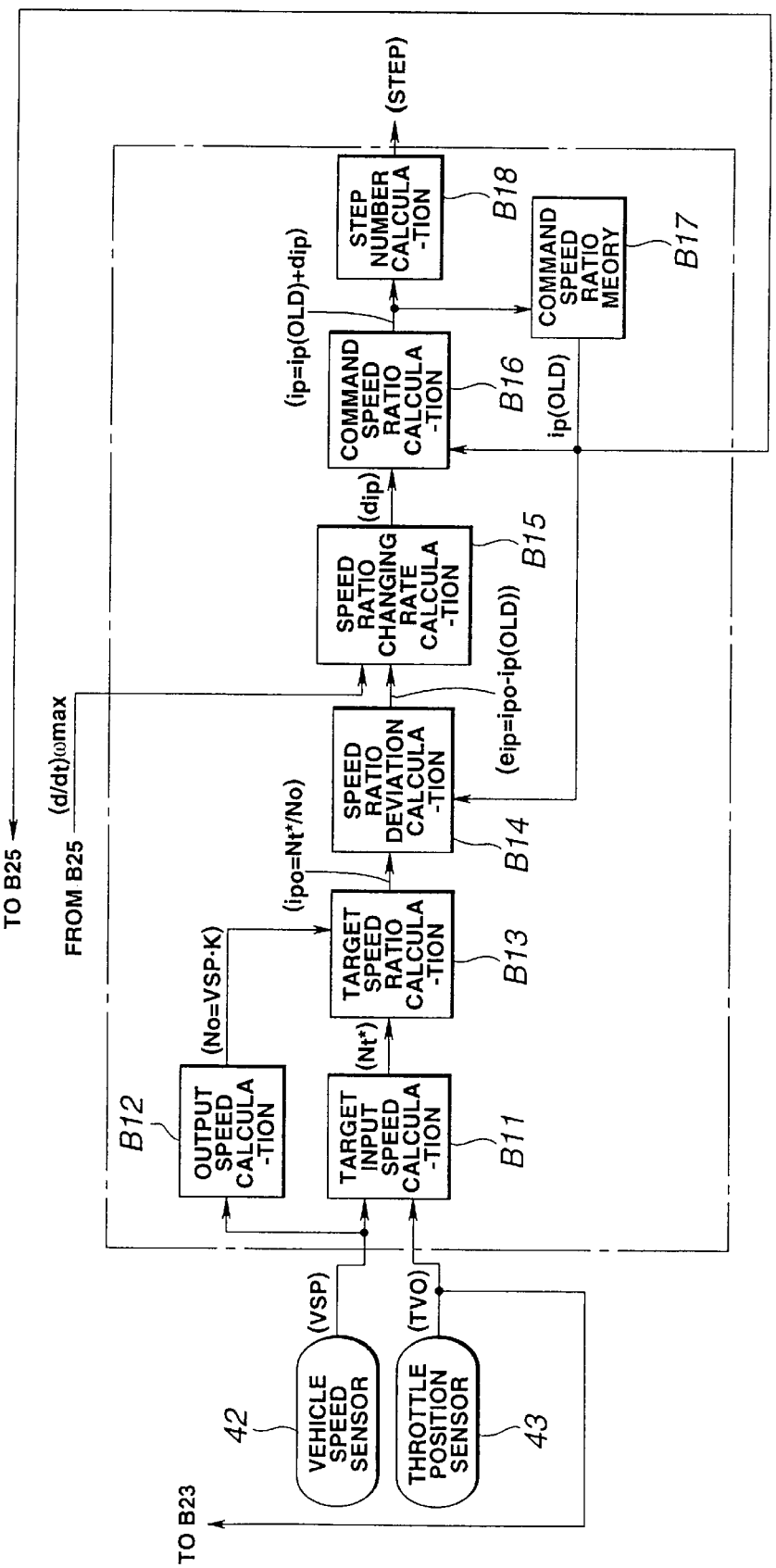
FIGS. 3 and 4 are block diagrams showing a series of processes performed to drive the step motor.
Figure 4:
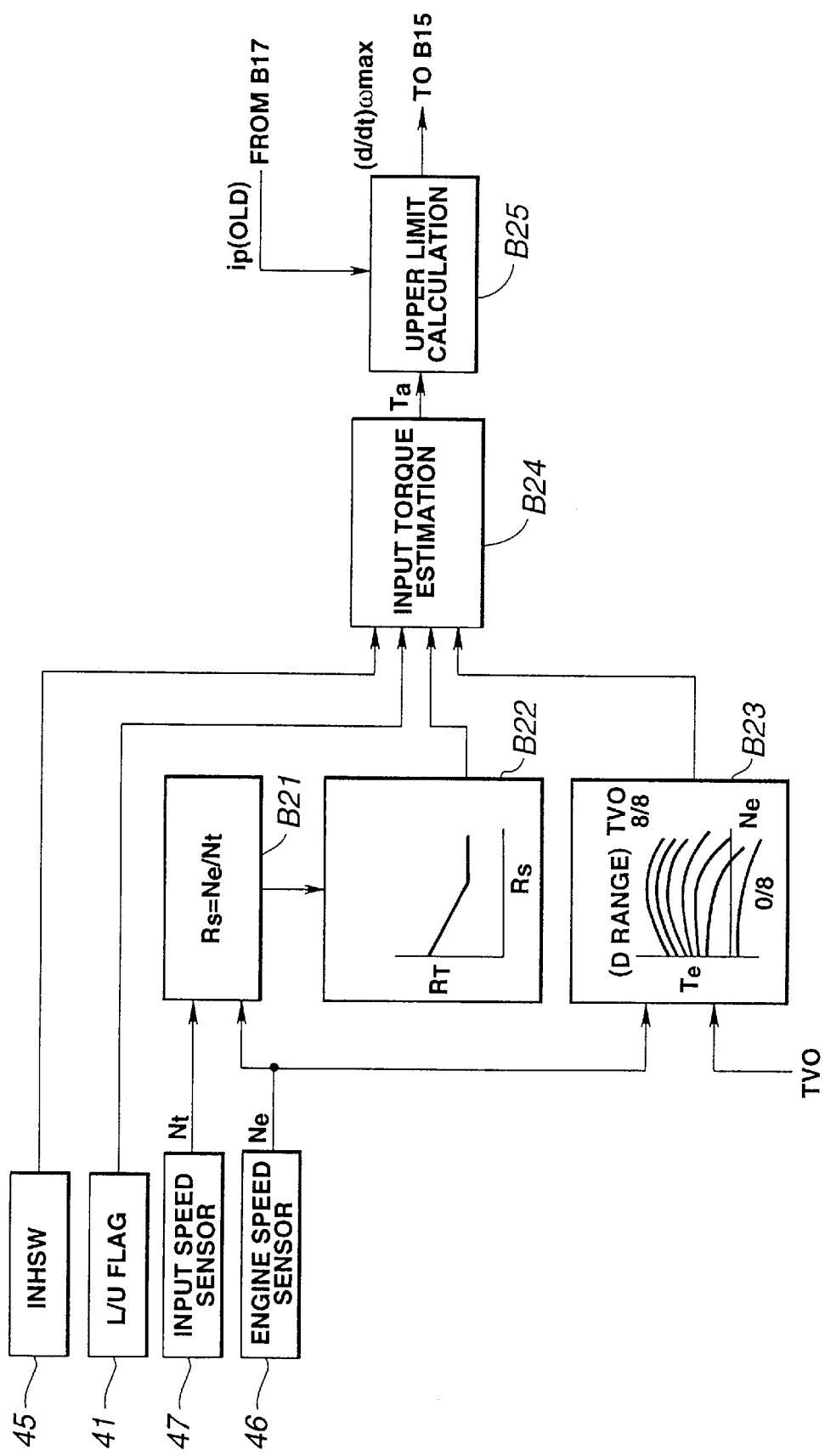

FIGS. 3 and 4 show one cycle of calculations, as shown in the form of blocks, performed to calculate the number (Step) of steps by which the step motor 22 rotates to make a change in the position of the shift control valve 21. This step number calculation cycle is repeated continuously at uniform intervals of time as long as the engine ignition switch 44 remains closed or ON.

Figure 5:
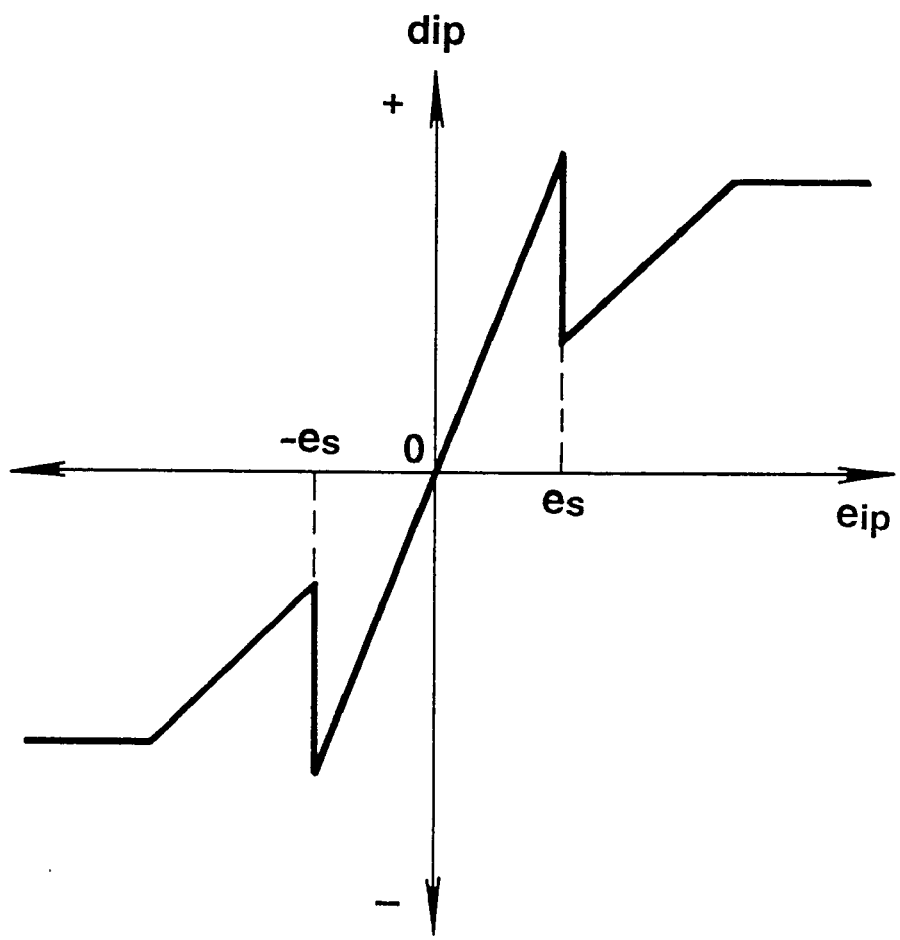
FIG. 5 is a graph showing a look-up table used in calculating the rate of change of the speed ratio.

Referring to FIG. 3, the block B11 calculates the required transmission input speed Nt*, which is suitable for the existing vehicle operating conditions, from a shift control map programmed in the control unit 41. The shift control map specifies the required transmission input speed Nt* as a function of vehicle speed VSP and throttle position TVO. For this purpose, the control unit 41 reads the vehicle speed signal fed thereto from the vehicle speed sensor 42 and the throttle position signal fed thereto from the throttle position sensor 43. It is to be understood, of course, that the parameter, the required transmission input speed Nt*, may be replaced with the required engine speed Ne*. In the block B12, the transmission output speed No is calculated as No=VSP×k where k is a constant. In the block B13, the required speed ratio $i_{p0}$ is calculated as $i_{p0}$=Nt*/No. In the block B14, a deviation $e_{ip}$ of the actual speed ratio $i_p$(OLD) from the required speed ratio $i_{p0}$ is calculated as $e_{ip}=i_{p0}-i_p$(OLD). The block B15 calculates the required rate $d_{ip}$ of change of the speed ratio, that is, the speed ratio change to be made when one step number calculation cycle is completed, from a map programmed into the control unit 41. This map defines the speed ratio changing rate $d_{ip}$ as a function of speed ratio deviation $e_{ip}$. Preferably, the map is set in such a manner that the rate of change of the speed ratio changing rate $d_{ip}$ is greater when the speed ratio deviation $e_{ip}$ exists in a predetermined range defined as $\pm e_s$ where $e_s$ is a predetermined value than when the speed ratio deviation $e_{ip}$ is out of the predetermined range, as shown in FIG. 5. The block B15 also receives an upper limit (d/dt) $\omega_{max}$ and limits the calculated speed ratio changing rate $d_{ip}$ based on the upper limit (d/dt) $\omega_{max}$. In the block B16, the command speed ratio $i_p$ is calculated as $i_p=i_p$(OLD)+$d_{ip}$ where $i_p$(OLD) is the last command speed ratio value calculated during the last step number calculation cycle and stored in the control unit 41. In the block B17, the calculated command speed ratio $i_p$, that is, the new command speed ratio, is used to update the last command speed ratio value $i_p$(OLD) stored in the control unit 41. The updated command speed ratio value $i_p$(OLD) is used for the calculations to be made in the blocks B14 and B16 during the next step number calculation cycle. In the block B18, the required step number (Step) is calculated based on the command speed ratio $i_p$ calculated in the block B16. The calculated step number (Step) is transferred to the step motor drive circuit included in the control unit 41 which thereby rotates the step motor 22 by the calculated number of steps to make a change in the position of the shift control valve 21 so as to achieve the command speed ratio $i_p$.

Although the speed ratio $i_p$(OLD) calculated during the last step number calculation cycle is used, as the actual speed ratio, to calculate the speed ratio deviation $e_{ip}$ in the block B14, it is to be understood that the actual speed ratio may be derived from the actual values sensed by the speed sensors 42 and 47.

Referring to FIG. 4, the block B21 calculates the torque converter speed ratio $R_s$ as $R_s$=Ne/Nt where Ne is the engine speed sensed by the engine speed sensor 46 and Nt is the transmission input shaft speed sensed by the transmission input shaft speed sensor 47. In the block B22, the torque ratio $R_T$ is calculated from a map programmed into the control unit 41. This map specifies the torque ratio $R_T$ as a function of torque converter speed ratio $R_s$, as shown in the block B22. The block B23 estimates the engine torque Te from one of maps corresponding to the selected one of ranges, for example, the D range. The map specifies the engine torque Te as a function of engine speed Ne and throttle position TVO in the form of one of nine ranges (0/8 to 8/8) into which the entire throttle position range is divided, as shown in the block 23. The block B24 estimate the input torque. This estimation is made based on the T/C speed ratio calculated in the block B21, the T/C torque ratio calculated in the block B22, the engine torque Te calculated in the block B23, the INHSW data fed thereto from the inhibition switch 45, and the L/U flag set in the control unit 41. The INHSW data indicate the selected one of the ranges (P, R, N, D and the like). The L/U flag is set at 1 to indicate that the lockup clutch 2a is engaged (ON) to operate the torque converter T/C to the lockup mode. The L/U flag is cleared to 0 when the lockup clutch 2a is disengaged (OFF) to operate the torque converter T/C in the converter mode. The transmission input torque Ti is estimated as Ti=Te×$R_T$ when the L/U flag=0, as Ti=Te when the L/U flag=1 and as Ti=0 when the N (neutral) range is selected. The block B25 calculates an upper limit (d/dt) $\omega_{max}$ for the rate $d_{ip}$ of change of the speed ratio. In this block, the upper limit (d/dt) $\omega_{max}$ is obtained by the reverse calculation, as the maximum value (d/dt) $\omega_{max}$ of the differentiated value (d/dt) $\omega$ from the following equation to satisfy a condition that the transmission output torque To is equal to or greater than zero:

$$\text{To}=i_p \{Te-I\cdot(d/dt)\omega\} \qquad (1)$$

where, I is the inertia of the drive train from the engine to the primary pulley, and $\omega$ is the speed of the primary pulley speed. The last command speed ratio $i_p$ (OLD) is fed from the block B17 (FIG. 3) for use as the actual speed ratio $i_p$. The calculated upper limit (d/dt) $\omega_{max}$ is fed to the block B15 (FIG. 3) for limiting the rate of change of the speed ratio below the upper limit (d/dt) $\omega_{max}$.

Although the speed ratio $i_p$(OLD) calculated during the last step number calculation cycle is used, as the actual speed ratio, to calculate the upper limit (d/dt) $\omega_{max}$ in the block B25, it is to be understood that the actual speed ratio may be derived from the actual values sensed by the speed sensors 42 and 47.

Figure 6:
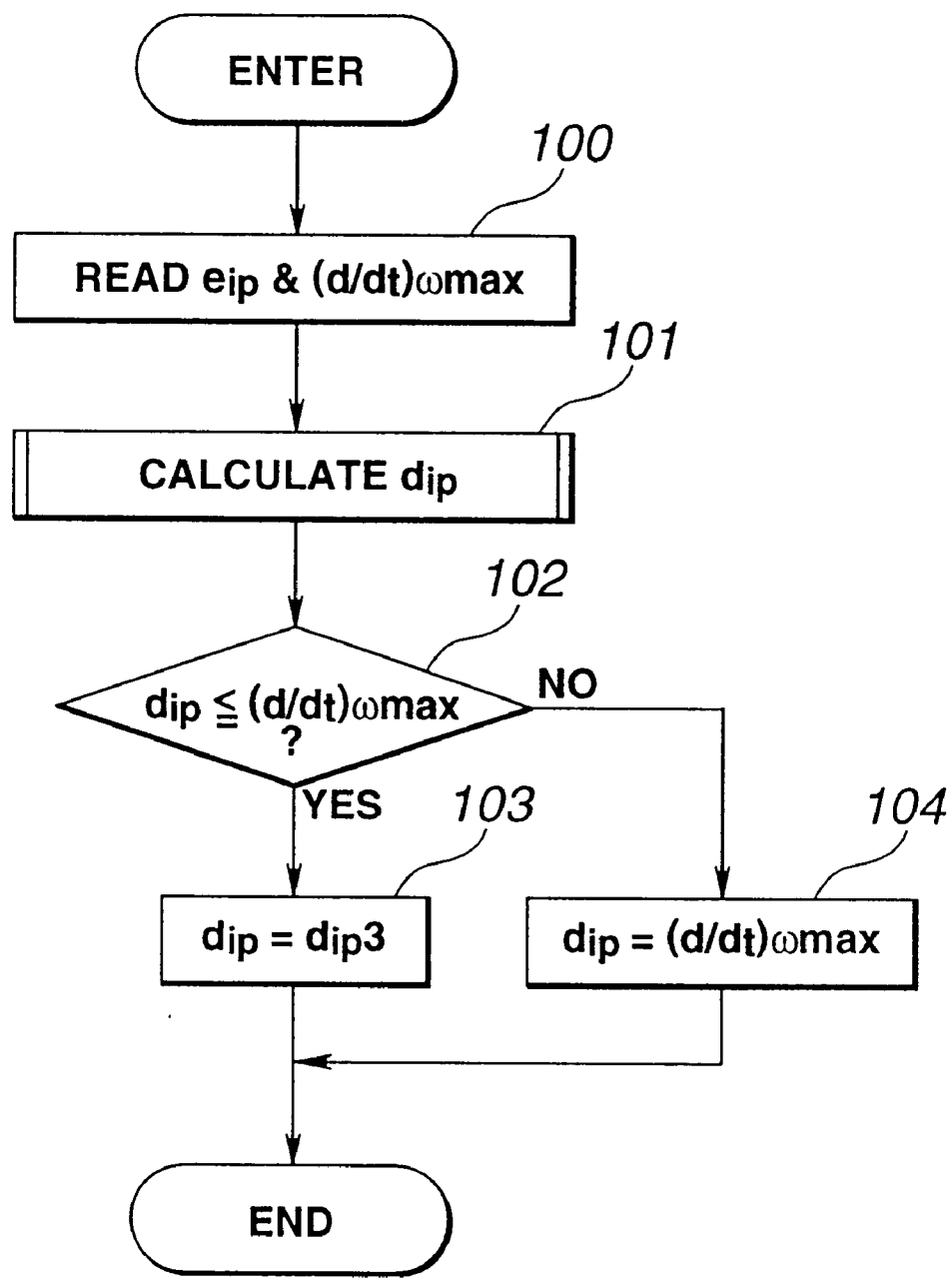
FIG. 6 is a flow diagram showing the programming of the digital computer as it is used to calculate the rate of change of the speed ratio.

FIG. 6 is a flow diagram illustrating the programming of the digital computer as it is used to make the calculation performed in the block B15. At the point 100 in the program, the speed ratio deviation $e_{ip}$ calculated in the block B14 and the upper limit (d/dt) $\omega_{max}$ are read into the computer memory. At the point 101, the rate $d_{ip}$ of change of the speed ratio is calculated from a map programmed into the computer. This map defines the rate $d_{ip}$ as a function of speed ratio deviation $e_{ip}$, as shown in FIG. 5. At the point 102, a determination is made as to whether or not the calculated rate $d_{ip}$ of change of the speed ratio is equal to or greater than the upper limit (d/dt) $\omega_{max}$. If the answer to this question is "yes", then the program proceeds to the point 103 where the calculated rate $d_{ip}$ is transferred as it is to the next block B16. Otherwise, the program proceeds to the point 104 where the upper limit (d/dt) $\omega_{max}$ is transferred as the required rate $d_{ip}$ of change of the speed ratio to the next block B16. Following this, the program proceeds to the end point.

According to this invention, rate $d_{ip}$ of change of the speed ratio is limited to the maximum value (d/dt) $\omega_{max}$ calculated to satisfy such a condition that the transmission output torque To is equal to or greater than zero. It is, therefore, possible to avoid an undesirable deceleration feel which may be provided to the passenger when the speed ratio changes at an excessive rate, for example, when a kick-down change is produced.

While the invention has been described in connection with the V-belt type continuously variable transmission as shown in FIG. 1, it is to be understood, of course, that the invention is applicable to other types of transmission, for example, toroidal type transmissions. While the invention has been described in connection with a shift control actuator as shown in FIG. 2, it is to be understood, of course, that the invention is not limited in any way to the illustrated case. While the engine torque or transmission input torque is estimated as a function of engine speed Ne and throttle position TVO, it is to be noted that an torque sensor may be used to sense the actual engine torque or transmission input torque. Even if the transmission output torque To is somewhat less than zero, the deceleration feel can be softened as compared to the case no limit is provided for the rate of change of the speed ratio as long as the deviation of the transmission output torque To from zero is small. In other words, some deceleration feel relaxation effect can be obtained when the transmission output torque To is a negative value substantially equal to zero. In this sense, the upper limit (d/dt) $\omega_{max}$ may be calculated by the reverse calculation of the maximum differentiated value (d/dt) $\omega_{max}$ from Equation (1) to satisfy a condition that the transmission output torque To is substantially equal to or greater than zero.

What is claimed is:

1. An apparatus for use with an automotive vehicle including an engine and a transmission coupled to the engine for transmitting a torque inputted thereto from the engine to produce an output torque at a continuously variable speed ratio, the apparatus comprising:

means for sensing vehicle operating conditions;

means for calculating a target value for the speed ratio based on the sensed vehicle operating conditions;

means for calculating a rate at which the speed ratio changes to the calculated target value;

means for calculating an upper limit for the rate to satisfy a condition that the output torque is substantially equal to or greater than zero; and means for limiting the rate of change of the speed ratio to the upper limit when the calculated rate of change of the speed ratio is greater than the upper limit.

2. The transmission control apparatus as claimed in claim 1, wherein the rate calculating means includes means for estimating an actual speed ratio, means for calculating a deviation of the target speed ratio value from the actual speed ratio value, and means for calculating the rate based on the deviation.

3. The transmission control apparatus as claimed in claim 2, wherein the rate calculating means includes means for changing the rate of change of the speed ratio at a first rate when an absolute value of the deviation is less than a predetermined value and at a second rate smaller than the first rate when the absolute value of the deviation exceeds the predetermined value.

4. The transmission control apparatus as claimed in claim 1, wherein the upper limit calculating means includes means for calculating the upper limit by a reverse calculation from the following equation:

$$To=i_p\{Te-I\cdot(d/dt)\omega\}$$

where, To: the output torque, $i_p$: the speed ration, Te: the engine torque, I: the inertia of drive train, and $\omega$: the input speed.

5. The transmission control apparatus as claimed in claim 4, wherein the rate calculating means includes means for estimating an actual speed ratio, means for calculating a deviation of the target speed ratio value from the actual speed ratio value, and means for calculating the rate based on the deviation.

6. The transmission control apparatus as claimed in claim 5, wherein the rate calculating means includes means for changing the rate of change of the speed ratio at a first rate when an absolute value of the deviation is less than a predetermined value and at a second rate smaller than the first rate when the absolute value of the deviation exceeds the predetermined value.

7. The transmission control apparatus as claimed in claim 4, which includes means for estimating the engine torque based on engine throttle position.

8. The transmission control apparatus as claimed in claim 7, wherein the rate calculating means includes means for estimating an actual speed ratio, means for calculating a deviation of the target speed ratio value from the actual speed ratio value, and means for calculating the rate based on the deviation.

9. The transmission control apparatus as claimed in claim 8, wherein the rate calculating means includes means for changing the rate of change of the speed ratio at a first rate when an absolute value of the deviation is less than a predetermined value and at a second rate smaller than the first rate when the absolute value of the deviation exceeds the predetermined value.

10. A method of controlling a transmission for use with an automotive vehicle including an engine, the transmission coupled to the engine for transmitting a torque inputted thereto from the engine to produce an output torque at a continuously variable speed ratio, the method comprising the steps of:

sensing vehicle operating conditions;

calculating a target value for the speed ratio based on the sensed vehicle operating conditions;

calculating a rate at which the speed ratio changes to the calculated target value;

calculating an upper limit for the rate to satisfy a condition that the output torque is substantially equal to or greater than zero; and limiting the rate of change of the speed ratio to the upper limit when the calculated rate of change of the speed ratio is greater than the upper limit.

11. The transmission control method as claimed in claim 10, wherein the rate of change of the speed ratio is calculated by estimating an actual speed ratio, calculating a deviation of the target speed ratio value from the actual speed ratio value, and calculating the rate based on the deviation.

12. The transmission control method as claimed in claim 11, wherein the rate of change of the speed ratio is calculated by changing the rate of change of the speed ratio at a first rate when an absolute value of the deviation is less than a predetermined value and at a second rate smaller than the first rate when the absolute value of the deviation exceeds the predetermined value.

13. The transmission control method as claimed in claim 10, wherein the upper limit is calculated by calculating the upper limit by a reverse calculation from the following equation:

$$To = \{Te - I \cdot (d/dt)\, \omega\}$$

where, To: the output torque, $i_p$: the speed ration, Te: the engine torque, I: the inertia of drive train, and $\omega$: the input speed.

14. The transmission control method as claimed in claim 13, wherein the rate of change of the speed ratio is calculated by estimating an actual speed ratio, calculating a deviation of the target speed ratio value from the actual speed ratio value, and calculating the rate based on the deviation.

15. The transmission control method as claimed in claim 14, wherein the rate of change of the speed ratio is calculated by changing the rate of change of the speed ratio at a first rate when an absolute value of the deviation is less than a predetermined value and at a second rate smaller than the first rate when the absolute value of the deviation exceeds the predetermined value.

16. The transmission control method as claimed in claim 13, wherein the engine torque is estimated based on engine throttle position.

17. The transmission control method as claimed in claim 16, wherein the rate of change of the speed ratio is calculated by estimating an actual speed ratio, calculating a deviation of the target speed ratio value from the actual speed ratio value, and calculating the rate based on the deviation.

18. The transmission control method as claimed in claim 17, wherein the rate of change of the speed ratio is calculated by changing the rate of change of the speed ratio at a first rate when an absolute value of the deviation is less than a predetermined value and at a second rate smaller than the first rate when the absolute value of the deviation exceeds the predetermined value.

* * * * *